Sept 8, 1925

J. L. DINSMOOR

SEAL

Filed Oct. 28, 1921

Fig. 2ª.

Inventor,
John L. Dinsmoor;
By Wilbur M. Stone,
his Attorney.

Patented Sept. 8, 1925.

1,553,146

UNITED STATES PATENT OFFICE.

JOHN L. DINSMOOR, OF NEW YORK, N. Y.

SEAL.

Application filed October 28, 1921. Serial No. 511,139.

*To all whom it may concern:*

Be it known that I, JOHN L. DINSMOOR, a citizen of the United States, residing at the city of New York, borough of Manhattan, county and State of New York, have invented a certain new and useful Seal, of which the following is a specification.

This invention is a seal, the same being adapted for use in connection with many machines, appliances, or apparatuses; in fact, the principles of the device enable it to be employed generally and without modification in many instances, or by such slight alterations as to meet the requirements of particular uses.

The object in view is the production of a seal which affords the required security, is easily and quickly applied, can not by any possibility be removed or tampered with, and which meets the demands of the trade for an economical and satisfactory substitute for the ordinary compressible lead and flexible shackle seal now so extensively used in many fields of industry.

The new device of my invention is adapted, more particularly, for use in connection with meters or car doors, wherein a shackle is to be inserted into co-operating parts, and thereafter the seal is closed and certain parts thereof are upset and mutually interlocked so as to afford a permanent connection so that the locked seal acts as a fixture which can be removed only by disrupting the seal itself.

Other functions and advantages of the invention will appear from the following description taken in connection with the drawings, wherein—

Figure 1:
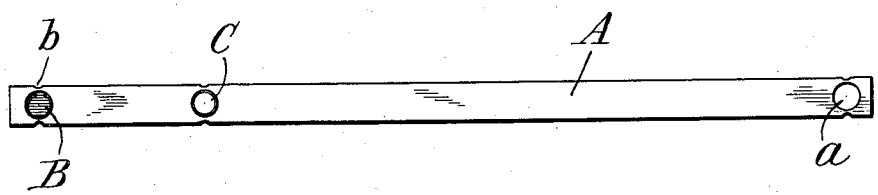
Figure 1 is a plan view of the seal prior to its application to a meter or car.
Figure 2:
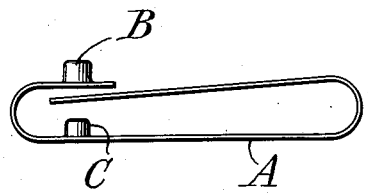
Figure 2 is an edge view.
Figure 2:
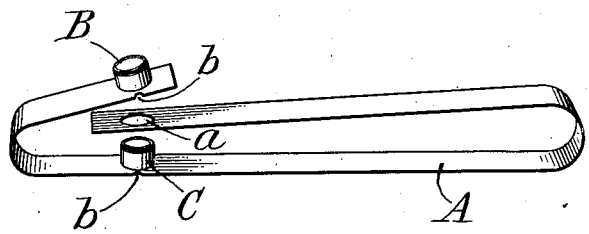

Figure 2ª a perspective view, illustrating the mode of doubling the seal in the act of applying it to a meter or car door, or other structure, and prior to upsetting certain parts of the seal to effect an interlocking engagement between such seal parts.

Figure 3:

Figure 3 is a view in edge elevation of the seal with its parts upset and interlocked.

The seal shown in the drawing is composed of a single piece of material, there being no separate parts requiring assemblage and attachment. Said seal comprises a member A, and a plurality of studs B C, said member A having an orifice $a$. The member A serves the function of a shackle when the seal is used on meters, car doors, or other structures whereon co-operating parts are provided for the reception of said seal. Said member A is composed of ductile metal, it being preferred in some cases to employ annealed metal, and it is a relatively narrow piece or band, similar to a ribbon. The hole $a$ is cut, punched, or otherwise produced in the metal at or near one end of the ribbon like member, and this orifice both as to location and dimensions has a definite relation to the studs B C. One of the studs, as B, is formed on the ribbon-like member at or near the end portion thereof opposite to the orifice, whereas the other stud C is formed on the member at a point intermediate orifice $a$ and stud B, said studs B, C, extending in opposite directions from the plane of member A. Each stud is of hollow formation, and is closed by a head at the end portion thereof remote to the plane of the member, said stud being integral with the member and said stud being seamless and drawn, by the usual metal drawing process, from the metal composing the member. As a result of the drawing process, the tubular wall of each stud is of less thickness or gage than the metal composing the member A, although the metal forming the head of the seamless stud is thicker or of slightly greater gage than the thickness of the metal composing the tubular wall of the stud. Furthermore, the stud is of such diameter that the operation of drawing the stud from the metal so draws on said metal of the member A as to produce lines of weaknesses indicated at $b$ in the opposite side edges of the metal. Again, the diameter of orifice $a$ is such that stud C can enter and pass freely through said orifice, and, the internal diameter of tubular stud B is slightly in excess of the external diameter of tubular stud C whereby the tubular studs may be telescopically assembled or fitted one to the other in the manipulation of the member A for application to the meter, car door, or other structure.

The mode of using the seal is as follows: The end of member A with orifice $a$ is passed or inserted through the meter, car door staples, or other co-operating parts of the structure to be sealed, whereupon the member A is doubled or looped for the end portion with orifice $a$ to be folded over stud C, or in other words, stud C is thrust into and through orifice $a$. The member is again doubled or folded, this time on a line midway between studs B C, so as to position stud B over and in register with stud C, as shown in Figures 2 and 2ª, whereupon stud B is pressed or forced over stud C so as to telescopically assemble the two studs and to confine that end portion of member A having the orifice *a* intermediate the two studs B C and thereafter pressure is applied by a suitable implement, press, or appropriate device so as to upset the metal of the two studs B C and to interlock together the metal composing the studs, whereby the end portions of the shackle formed by the doubled member A are locked so securely one to the other as to act as an efficient and reliable seal. The security of the seal is increased by the telescopic assemblage and upsetting of the tubular headed studs, it being apparent that the relatively thin walls of the tubular studs will permit the studs to collapse under pressure whereas the heads at the outer ends of the studs will flatten under pressure. Prior to upsetting the studs they are telescopically fitted one within the other, and when upset the metal of the studs flatten as shown in Figure 3 and are mutually locked so that the seal cannot be pried open and any attempt to tamper with the seal is plainly evident.

It is to be noted that the seal just described embodies a flexible member provided with a plurality of protruding studs and with a smooth orifice there being no protruding edge or flange bounding the edge of said orifice. The described construction permits the use of quite thin metal and when the seal is applied and the studs are compressed into locking engagement, a joint is produced which is reinforced by the metal so that no strain is put upon the thin metal surrounding the orifice during the operation of upsetting the studs or "closing" the seal. Obviously, the apertured end of the flexible member may be inserted into and through a small aperture. In the operation of applying the seal, the metal member is bent quickly and easily so as to secure the desired registration of the studs with the orifice and with each other, the parts being perfectly alined prior to the application of pressure, and after such application the seal is locked by the simple application of pressure by the aid of a suitable tool such as a hand press.

My sealing device comprises a minimum number of parts, all integral; in fact, only one piece of metal is required. There is no waste of metal in the production of the seal, the same being made from ribbon-like stock metal. The making of the seal requires a minimum number of operations, no blanking dies being necessary, and simple forms of tools being employed.

Having thus fully described the invention, what I claim as new and desire to secure by Letters Patent is:

1. A seal embodying a flexible member provided with an orifice, and a plurality of tubular headed studs integral with said member and extending outwardly from the plane of said member, one of said studs being adapted to pass through said orifice and another of said studs to telescope over the orifice-spanned stud.

2. A seal embodying a bendable member composed of flexible material and provided near one end with an orifice, and a plurality of tubular headed studs, said strip being bendable for one of said studs to pass through said orifice and bendable for the other of said studs to telescope the first named stud.

3. A seal embodying a member composed of flexible material and provided with an orifice and with a plurality of headed tubular studs, said strip being bendable at two points for the end portions to overlap and for said studs to telescopically fit one into the other, the inner stud being first passed through said orifice, and for the respective end portions of the strip to be locked by upsetting the studs into mutually interlocking relation.

In testimony whereof I have hereto signed my name this 22nd day of October, 1921.

JOHN L. DINSMOOR.